(12) United States Patent
Zhou

(10) Patent No.: US 11,353,939 B2
(45) Date of Patent: Jun. 7, 2022

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Sisi Zhou, Hubei (CN)

(73) Assignee: WUHAN CHINA STAR OPTOELECTRONICS SEMICONDUCTOR DISPLAY TECHNOLOGY CO.. LTD., Hubei (CN)

( * ) Notice: Subject to any disclaimer, the term of this patent is extended or adjusted under 35 U.S.C. 154(b) by 233 days.

(21) Appl. No.: 16/613,241

(22) PCT Filed: Jun. 17, 2019

(86) PCT No.: PCT/CN2019/091462
§ 371 (c)(1),
(2) Date: Nov. 13, 2019

(87) PCT Pub. No.: WO2020/215465
PCT Pub. Date: Oct. 29, 2020

(65) Prior Publication Data
US 2021/0333845 A1  Oct. 28, 2021

(30) Foreign Application Priority Data
Apr. 26, 2019 (CN) .......................... 201910341634.6

(51) Int. Cl.
*G06F 1/18* (2006.01)

(52) U.S. Cl.
CPC .............. *G06F 1/189* (2013.01); *G06F 1/183* (2013.01)

(58) Field of Classification Search
CPC ....................................................... G06F 1/16
See application file for complete search history.

(56) References Cited

U.S. PATENT DOCUMENTS

| | | |
|---|---|---|
| 2005/0001211 A1 | 1/2005 | Yamazaki et al. |
| 2007/0109735 A1 | 5/2007 | Yamazaki et al. |
| 2010/0259548 A1 | 10/2010 | Yamazaki et al. |
| 2012/0032966 A1 | 2/2012 | Yamazaki et al. |
| 2013/0161623 A1 | 6/2013 | Yamazaki et al. |

(Continued)

FOREIGN PATENT DOCUMENTS

| | | |
|---|---|---|
| CN | 105977400 A | 9/2016 |
| CN | 207233319 U | 4/2018 |

(Continued)

*Primary Examiner* — Jerry Wu

(57) ABSTRACT

Provided is a display panel, which includes a display region, a fanout region and a bonding region. The fanout region is disposed between the display region and the bonding region. The fanout region includes a first subregion, a bending subregion and a second subregion. The first subregion is connected to the display region. The second subregion is connected to the bonding region. The bending subregion is connected to the first subregion and the second subregion. When the bending subregion is bent toward a rear face of the display region, the second subregion and the bonding region are located on the rear face of the display region.

4 Claims, 3 Drawing Sheets

(56) References Cited

U.S. PATENT DOCUMENTS

| | | | |
|---|---|---|---|
| 2016/0188098 A1* | 6/2016 | Her | G06F 3/04164 |
| | | | 345/173 |
| 2016/0372672 A1 | 12/2016 | Yamazaki et al. | |
| 2018/0224688 A1 | 8/2018 | Chen et al. | |
| 2019/0109622 A1* | 4/2019 | Wang | H04B 7/0452 |

FOREIGN PATENT DOCUMENTS

| | | |
|---|---|---|
| CN | 109559644 A | 4/2019 |
| CN | 109599403 A | 4/2019 |
| JP | 2004247373 A | 9/2004 |
| KR | 2017102142 A | 9/2017 |

\* cited by examiner

DISPLAY PANEL

BACKGROUND

1. Field of Disclosure

The present application relates to display technologies, and more particularly, to a display panel.

2. Description of Related Art

Referring to FIG. 1, in an existing rigid display panel 013, the rigid display panel 013 includes a display region 101 and a non-display region 102 distributed around the display region 101. Generally, a bottom bezel of the non-display region 102 is divided into metal fanout traces 103 and a bonding region 104 such that the bottom bezel occupies a large space, resulting in unable to carry out narrow bezel for the existing display panel.

SUMMARY

Embodiments of the present application provide a display panel, for solving the problem of a great deal of needs of narrow bezel for the existing display panels.

Embodiments of the present application provide a display panel, which includes:

a display region, configured to display images;

a fanout region, disposed between the display region and a bonding region; and the bonding region, configured to bond with a driving chip, wherein the fanout region includes a first subregion, a bending subregion and a second subregion, the first subregion connects to the display region, the second subregion connects to the bonding region, the bending subregion connects to the first subregion and the second subregion;

wherein when the bending subregion is bent toward a rear face of the display region, the second subregion and the bonding region are located on the rear face of the display region;

wherein the display panel includes a first rigid substrate, a second rigid substrate and a flexible substrate, the display region and the first subregion are disposed on the first rigid substrate, the bonding region and the second subregion are disposed on the second rigid substrate, the bending subregion is disposed on the flexible substrate; and wherein the fanout region includes a plurality of fanout traces, each of which includes a first portion disposed in the first subregion, a bending portion disposed in the bending subregion and a second portion disposed in the second subregion, the bending portion is electrically connected to the first portion and the second portion, the first portion is electrically connected to the display region, the second portion is electrically connected to the bonding region.

In the display panel of the present application, each of the first portion includes a first metal trace and a first solder pad connecting to an end of the first metal trace, the first solder pad is disposed at an end of the first metal trace away from the display region;

each of the second portion includes a second metal trace and a second solder pad connecting to an end of the second metal trace, the second solder pad is disposed at an end of the second metal trace away from the bonding region;

each of the bending portion includes a third metal trace, and a third solder pad and a fourth solder pad that are connected to two ends of the third metal trace, respectively; and the third solder pad is electrically connected to the first solder pad and the fourth solder pad is electrically connected to the second solder pad.

In the display panel of the present application, conductive glue is electrically connected between the third solder pad and the first solder pad and between the fourth solder pad and the second solder pad.

In the display panel of the present application, contact faces of the first solder pad, the second solder pad, the third solder pad and the fourth solder pad that contact the conductive glue are concave faces.

In the display panel of the present application, the third metal trace includes a trace body and through-holes disposed on the trace body, the through-holes are disposed at intervals along extension of the trace body.

In the display panel of the present application, spacing between the through-holes gradually decreases from two sides to the middle.

In the display panel of the present application, both of two lateral edges of the trace body are curved edges.

In the display panel of the present application, the through-holes are shaped as one of an ellipse, a circle and a rhombus.

Embodiments of the present application provide a display panel, which includes:

a display region, configured to display images;

a fanout region, disposed between the display region and a bonding region; and the bonding region, configured to bond with a driving chip, wherein the fanout region includes a first subregion, a bending subregion and a second subregion, the first subregion connects to the display region, the second subregion connects to the bonding region, the bending subregion connects to the first subregion and the second subregion;

wherein when the bending subregion is bent toward a rear face of the display region, the second subregion and the bonding region are located on the rear face of the display region.

In the display panel of the present application, the display panel includes a first rigid substrate, a second rigid substrate and a flexible substrate, the display region and the first subregion are disposed on the first rigid substrate, the bonding region and the second subregion are disposed on the second rigid substrate, the bending subregion is disposed on the flexible substrate.

In the display panel of the present application, the fanout region includes a plurality of fanout traces, each of which includes a first portion disposed in the first subregion, a bending portion disposed in the bending subregion and a second portion disposed in the second subregion, the bending portion is electrically connected to the first portion and the second portion, the first portion is electrically connected to the display region, the second portion is electrically connected to the bonding region.

In the display panel of the present application, each of the first portion includes a first metal trace and a first solder pad connecting to an end of the first metal trace, the first solder pad is disposed at an end of the first metal trace away from the display region;

each of the second portion includes a second metal trace and a second solder pad connecting to an end of the second metal trace, the second solder pad is disposed at an end of the second metal trace away from the bonding region;

each of the bending portion includes a third metal trace, and a third solder pad and a fourth solder pad that are connected to two ends of the third metal trace, respectively; and the third solder pad is electrically connected to the first solder pad and the fourth solder pad is electrically connected to the second solder pad.

In the display panel of the present application, conductive glue is electrically connected between the third solder pad and the first solder pad and between the fourth solder pad and the second solder pad.

In the display panel of the present application, contact faces of the first solder pad, the second solder pad, the third solder pad and the fourth solder pad that contact the conductive glue are concave faces.

In the display panel of the present application, the third metal trace includes a trace body and through-holes disposed on the trace body, the through-holes are disposed at intervals along extension of the trace body.

In the display panel of the present application, spacing between the through-holes gradually decreases from two sides to the middle.

In the display panel of the present application, both of two lateral edges of the trace body are curved edges.

In the display panel of the present application, the through-holes are shaped as one of an ellipse, a circle and a rhombus.

Compared to the display panel of the existing arts, the display panel of the present application carries out reducing the bezel width by disposing the bending subregion in the fanout region, and locating the second subregion and the bonding region on the rear face of the display region by bending the bending subregion. This solves the problem of a great deal of needs of narrow bezel for the existing display panels.

BRIEF DESCRIPTION OF DRAWINGS

To illustrate the technical solutions in the embodiments of the present application or in the existing skills more clearly, the following briefly introduces the accompanying drawings required for describing the embodiments of the present application. The accompanying drawings in the following description show some embodiments of the present application, and a person of ordinary skill in the art may still derive other drawings from these accompanying drawings without creative efforts.

DETAILED DESCRIPTION OF PREFERRED EMBODIMENTS

Please refer to the appending drawings, the same components are indicated by the same reference numbers. The following descriptions are based on the exemplary embodiment of the present application and should not be taken as a limitation to other embodiments of the present application not described herein.

Figure 1:
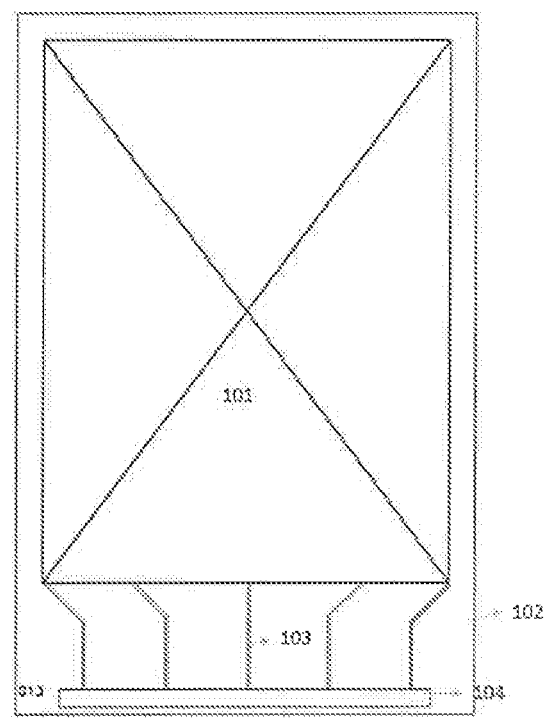
FIG. 1 is a schematic structural diagram showing an existing display panel.
Figure 2:
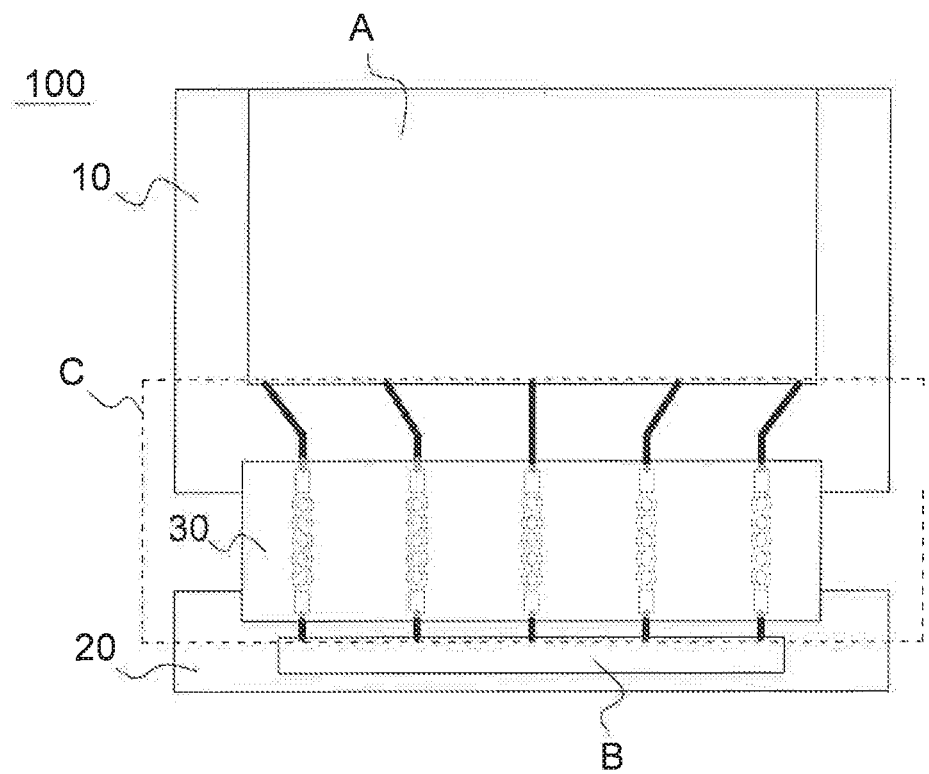
FIG. 2 is a schematic diagram showing a structure of a display panel in accordance with embodiments of the present application.
Figure 3:
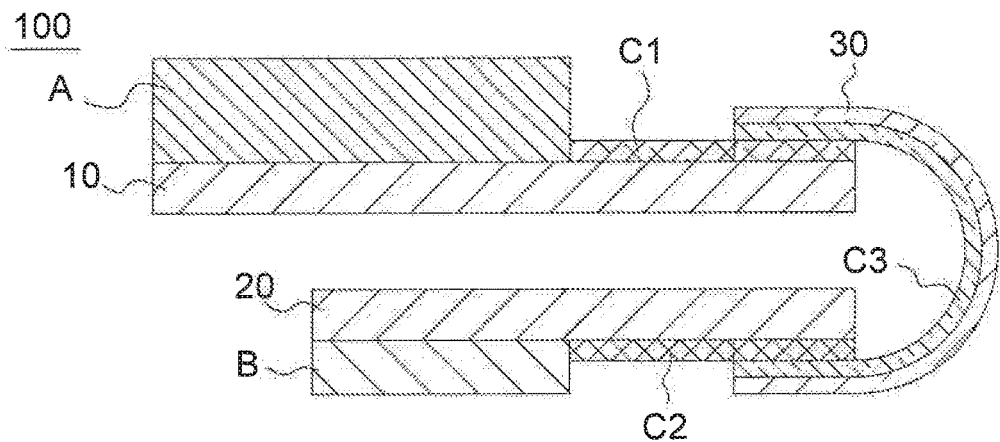
FIG. 3 is a schematic diagram showing another structure of the display panel in accordance with embodiments of the present application.

Please refer to FIG. 2 and FIG. 3. FIG. 2 is a schematic diagram showing a structure of a display panel in accordance with embodiments of the present application. FIG. 3 is a schematic diagram showing another structure of the display panel in accordance with embodiments of the present application. The display panel 100 of the embodiments of the present application includes a display region A, a fanout region C and a bonding region B.

The display region A is configured to display images. The fanout region C is disposed between the display region A and the bonding region B. The bonding region B is configured to bond with a driving chip.

The fanout region C includes a first subregion C1, a bending subregion C3 and a second subregion C2. The first subregion C1 is connected to the display region A. The second subregion C2 is connected to the bonding region B. The bending subregion C3 is connected to the first subregion C1 and the second subregion C2.

When the bending subregion C3 is bent toward a rear face of the display region A, the second subregion C2 and the bonding region B are located on the rear face of the display region A.

In the display panel 100 of the present embodiment, bezel width is reduced by disposing the fanout region C in the bending subregion C3 and locating the second subregion C2 and the bonding region B on the rear face of the display region A by bending the bending subregion C3.

In the display panel 100 of the present embodiment, the display panel 100 includes a first rigid substrate 10, a second rigid substrate 20 and a flexible substrate 30. The display region A and the first subregion C1 are disposed on the first rigid substrate 10. The bonding region B and the second subregion C2 are disposed on the second rigid substrate 20. The bending subregion C3 is disposed on the flexible substrate 30.

That is to say, the first rigid substrate 10 is shared by the display region A and the first subregion C2. The second rigid substrate 20 is shared by the second subregion C2 and the bonding region B. Both of the first rigid substrate 10 and the second rigid substrate 20 can be a rigid glass substrate. The flexible substrate 30 can be a polyimide (PI) substrate.

The bending subregion C3 is formed on the flexible substrate 30 for ease of bending the bending subregion C3. In addition, the first rigid substrate 10 and the second rigid substrate 20 are formed by cutting a same piece of glass substrate in the processes of manufacturing the display panel 100.

In the existing arts, the display panel cannot be bent since both of the display region and a bottom bezel region (including the fanout region and the bonding region) of the display panel are formed on a rigid glass substrate. This causes the bottom bezel region to become too wide. In the present embodiment, a portion of the fanout region C is individually extracted to be formed on the flexible substrate 30 for ease of bending, and in a further step, the bonding region B is disposed on the rear face of the display region A to reduce the width of bottom bezel. Said portion is the bending subregion C3.

Figure 4:
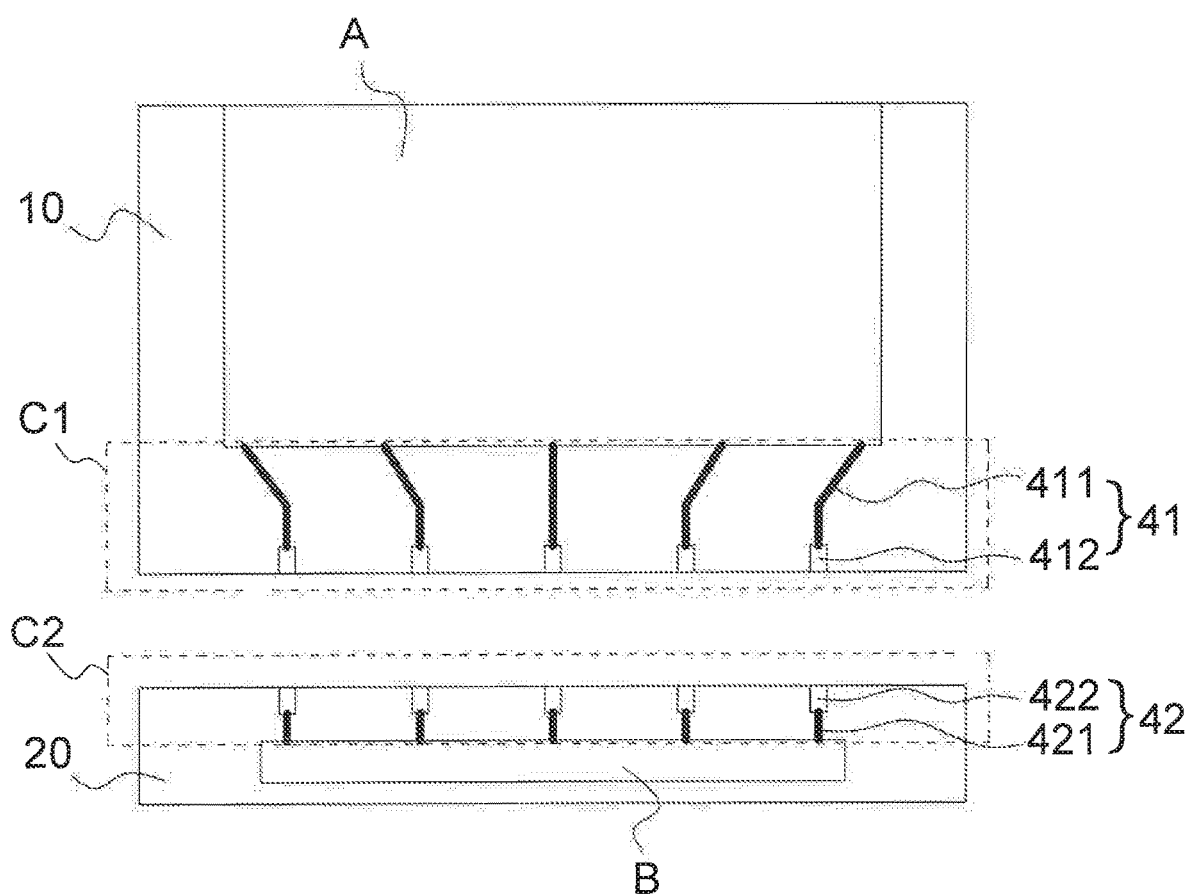
FIG. 4 is a schematic diagram showing a structure of a display panel including a display region, a first subregion, a second subregion and a bonding region that are in a flattened state in accordance with embodiments of the present application.
Figure 5:
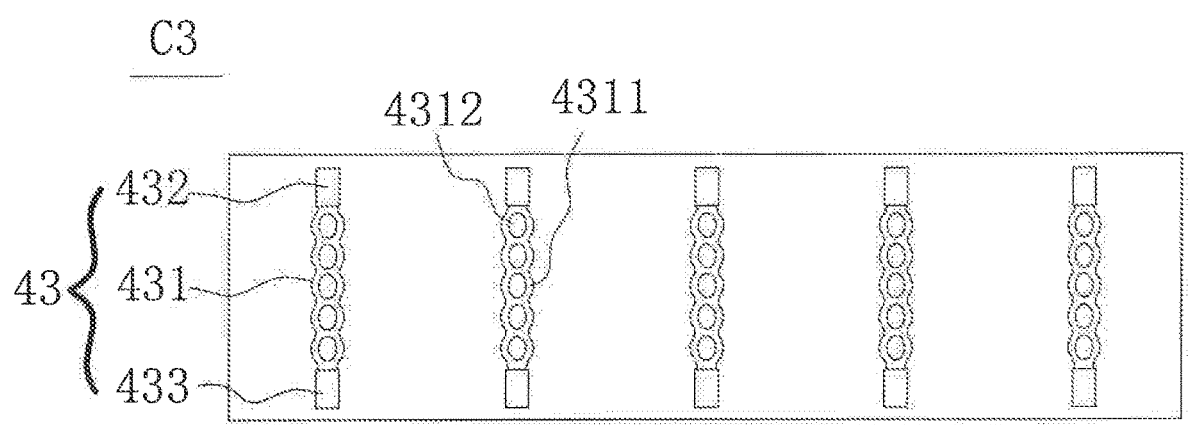
FIG. 5 is a schematic diagram showing a structure of the display panel including a bending subregion that is in a flattened state in accordance with embodiments of the present application.

Please refer to FIG. 4 and FIG. 5. FIG. 4 is a schematic diagram showing a structure of a display panel including a display region, a first subregion, a second subregion and a bonding region that are in a flattened state in accordance with embodiments of the present application. FIG. 5 is a schematic diagram showing a structure of the display panel including a bending subregion that is in a flattened state in accordance with embodiments of the present application.

In the display panel 100 of the present embodiment, the fanout region C includes a plurality of fanout traces. Each of the fanout traces 40 includes a first portion 41 disposed in the first subregion C1, a bending portion 43 disposed in the bending subregion C3 and a second subregion 42 disposed in the second subregion C2. The bending portion 43 is electrically connected to the first portion 41 and the second portion 42. The first portion 41 is electrically connected to the display region A. The second portion 42 is electrically connected to the bonding region B.

Specifically, each of the first portion 41 includes a first metal trace 411 and a first solder pad 412 connecting to an end of the first metal trace 411. The first solder pad 412 is disposed at an end of the first metal trace 411 away from the display region A.

Each of the second portion 42 includes a second metal trace 421 and a second solder pad 422 connecting to an end of the second metal trace 421. The second solder pad 422 is disposed at an end of the second metal trace 421 away from the bonding region B.

Each of the bending portion 43 includes a third metal trace 431, and a third solder pad 432 and a fourth solder pad 433 that are connected to two ends of the third metal trace 431, respectively.

The third solder pad 432 is electrically connected to the first solder pad 412. The fourth solder pad 433 is electrically connected to the second solder pad 422.

Conductive glue is electrically connected between the third solder pad 432 and the first solder pad 412 and between the fourth solder pad 433 and the second solder pad 422.

All of contact faces of the first solder pad 412, the second solder pad 422, the third solder pad 432 and the fourth solder pad 433 that contact the conductive glue are curved faces. In such a way, when the first solder pad 412 cooperates with the third solder pad 432 and the second solder pad 422 cooperates with the fourth solder pad 433, it is convenient to capture conductive particles in the conductive glue and increase an area contacting the conductive glue, thereby improving stability of an interface between the first solder pad 412 and the third solder pad 432 and an interface between the second solder pad 422 and the fourth solder pad 433.

In the display panel 100 of the present embodiment, the third metal trace 431 includes a trace body 4311 and through-holes 4312 disposed on the trace body 4311. The through-holes 4312 are disposed at intervals along extension of the trace body 4311. The deployment of the through-holes 4312 can release bending stress when the third metal trace 431 is bent, thereby improving bending durability of the third metal trace 431.

The spacing between the through-holes 4312 gradually decreases from two sides to the middle. When the bending subregion C3 is bending, the third metal trace 431 forms an arc structure. This makes a middle portion of the third metal trace 431 suffer the greatest bending stress which gradually decreases toward two sides of a central line. Therefore, the deployment in which the spacing between the through-holes 4312 gradually decreases from the two sides to the middle makes the third metal trace 431 release the bending stress pertinently, thereby improving the bending durability of the third metal trace 431 in a further step. Optionally, the through-holes 4312 are shaped as one of an ellipse, a circle and a rhombus.

Both of two lateral edges of the trace body 4311 are curved edges. In such a deployment, it makes ease of increasing the bending durability of the third metal trace 431.

The processes of manufacturing the display panel 100 of the present embodiment are described below.

First, a rigid glass substrate is provided.

Second, the display region A, the fanout region C and the bonding region B are formed on the rigid glass substrate. That is, the whole circuit structures of the display panel are formed on the glass substrate. This includes forming complete fanout traces and circuit structures for the bonding on the fanout region C and the bonding region B.

In the process of forming the fanout traces, the fanout traces are formed on the rigid glass substrate and meanwhile two solder pads are formed on each of the metal traces. The two solder pads are the first solder pad 412 and the second solder pad 422, respectively. The spacing between the first solder pad 412 and the second solder pad 422 is ranged between 500 nanometers and 5 millimeters.

Third, the bending subregion C3 is formed on the flexible substrate 30. That is, a plurality of third metal traces 431, the third solder pad 432 and the fourth solder pad 433 are formed on the flexible substrate 30. The two ends of each of the third metal traces 431 are connected to the third solder pad 412 and the fourth solder pad 433, respectively. And a one-to-one correspondence is established between the third metal traces 431 and the fanout trace on the rigid glass substrate.

Fourth, a portion between the first solder pad 412 and the second solder pad 422 of the display panel is removed by cutting. The rigid glass substrate is cut into three pieces. A rigid glass substrate for disposing the display region A and the first subregion C1 is the first rigid substrate 10. The fanout traces located in the first subregion C1 is the first portion 41. A rigid glass substrate for disposing the bonding region B and the second subregion C2 is the second rigid substrate 20. The fanout traces located in the second subregion C2 is the second portion 42. The last rigid glass substrate for supporting the fanout traces correspondingly located on it is cut out.

Fifth, a plurality of third solder pads 432 in the bending subregion C3 corresponds to the plurality of first solder pads 412 one by one and they are bonded together by the conductive glue; a plurality of fourth solder pads 433 in the bending subregion C3 corresponds to the plurality of second solder pads 422 in the second subregion C2 one by one and they are bonded together by the conductive glue.

In a last step, the bending subregion C3 is bent such that the second subregion C2 and the bonding region B of the fanout region C are located on the rear face of the display region A.

In such a way, the manufacturing process of the present application is accomplished.

Compared to the display panel of the existing arts, the display panel of the present application carries out reducing the bezel width by disposing the bending subregion in the fanout region, and locating the second subregion and the bonding region on the rear face of the display region by bending the bending subregion. This solves the problem of a great deal of needs of narrow bezel for the existing display panels.

Based on the description given above, those having ordinary skills of the art may easily contemplate various changes and modifications of the technical solution and technical ideas of the present application and all these changes and modifications are considered within the protection scope of right for the present application.

The invention claimed is:

1. A display panel, comprising:
a display region, configured to display images;
a fanout region, disposed between the display region and a bonding region; and
the bonding region, configured to bond with a driving chip,
wherein the fanout region comprises a first subregion, a bending subregion and a second subregion, the first subregion connects to the display region, the second subregion connects to the bonding region, the bending subregion connects to the first subregion and the second subregion;
wherein when the bending subregion is bent toward a rear face of the display region, the second subregion and the bonding region are located on the rear face of the display region;
wherein the display panel comprises a first rigid substrate, a second rigid substrate and a flexible substrate, the display region and the first subregion are disposed on the first rigid substrate, the bonding region and the second subregion are disposed on the second rigid substrate, the bending subregion is disposed on the flexible substrate; and
wherein the fanout region comprises a plurality of fanout traces, each of which comprises a first portion disposed in the first subregion, a bending portion disposed in the bending subregion and a second portion disposed in the second subregion, the bending portion is electrically connected to the first portion and the second portion, the first portion is electrically connected to the display region, the second portion is electrically connected to the bonding region,
wherein each of the bending portion comprises a third metal trace, and the third metal trace comprises a trace body and through-holes disposed on the trace body, the through-holes are disposed at intervals along extension of the trace body; and spacing between the through-holes gradually decreases from two sides to the middle; and the through-holes are shaped as one of an ellipse, a circle and a rhombus.

2. A display panel, comprising:
a display region, configured to display images;
a fanout region, disposed between the display region and a bonding region; and
the bonding region, configured to bond with a driving chip,
wherein the fanout region comprises a first subregion, a bending subregion and a second subregion, the first subregion connects to the display region, the second subregion connects to the bonding region, the bending subregion connects to the first subregion and the second subregion; and
wherein when the bending subregion is bent toward a rear face of the display region, the second subregion and the bonding region are located on the rear face of the display region,
wherein the display panel comprises a first rigid substrate, a second rigid substrate and a flexible substrate, the display region and the first subregion are disposed on the first rigid substrate, the bonding region and the second subregion are disposed on the second rigid substrate, the bending subregion is disposed on the flexible substrate;
wherein the fanout region comprises a plurality of fanout traces, each of which comprises a first portion disposed in the first subregion, a bending portion disposed in the bending subregion and a second portion disposed in the second subregion, the bending portion is electrically connected to the first portion and the second portion, the first portion is electrically connected to the display region, the second portion is electrically connected to the bonding region, wherein each of the bending portion comprises a third metal trace, and the third metal trace comprises a trace body and through-holes disposed on the trace body, the through-holes are disposed at intervals along extension of the trace body; and spacing between the through-holes gradually decreases from two sides to the middle; and the through-holes are shaped as one of an ellipse, a circle and a rhombus.

3. The display panel according to claim 2, wherein the display panel comprises a first rigid substrate, a second rigid substrate and a flexible substrate, the display region and the first subregion are disposed on the first rigid substrate, the bonding region and the second subregion are disposed on the second rigid substrate, the bending subregion is disposed on the flexible substrate.

4. The display panel according to claim 2, wherein the fanout region further comprises a plurality of fanout traces, each of which comprises a first portion disposed in the first subregion and a second portion disposed in the second subregion, the bending portion is electrically connected to the first portion and the second portion, the first portion is electrically connected to the display region, the second portion is electrically connected to the bonding region.

* * * * *